(12) United States Patent
Gomi et al.

(10) Patent No.: US 6,301,634 B1
(45) Date of Patent: Oct. 9, 2001

(54) REAL TIME CONTROL METHOD FOR A ROBOT CONTROLLER

(75) Inventors: Kazuhiro Gomi; Hiroshi Miyazawa; Masayuki Okuyama, all of Suwa; Norio Yokoshima; Toshimi Shioda, both of Narashino, all of (JP)

(73) Assignees: Seiko Epson Corporation, Tokyo; Seiko Seiki Colk Ltd., Chiba-Ken, both of (JP)

( * ) Notice: Subject to any disclaimer, the term of this patent is extended or adjusted under 35 U.S.C. 154(b) by 0 days.

(21) Appl. No.: 09/482,387

(22) Filed: Jan. 12, 2000

Related U.S. Application Data (62) Division of application No. 08/876,697, filed on Jun. 16, 1997, now Pat. No. 6,031,973.

(30) Foreign Application Priority Data

Jul. 5, 1996 (JP) .................................................. 8-195352

(51) Int. Cl.[7] ...................................................... G06F 13/24
(52) U.S. Cl. .......................... 710/267; 710/268; 709/102; 709/106
(58) Field of Search ............................. 710/61, 104, 107, 710/126, 131, 129, 262, 267, 268, 269; 712/220, 228, 231, 232, 233, 235, 241, 247; 709/102, 106, 107, 108

(56) References Cited

U.S. PATENT DOCUMENTS

| | | |
|---|---|---|
| 4,954,948 | 9/1990 | Hira et al. . |
| 5,016,166 | 5/1991 | Van Loo et al. . |
| 5,193,189 | 3/1993 | Flood et al. . |
| 5,608,906 | 3/1997 | Tonouchi et al. . |
| 5,625,821 | 4/1997 | Record et al. . |
| 5,627,745 | 5/1997 | Flood . |
| 5,742,824 | 4/1998 | Kosaka . |
| 5,850,536 | 12/1998 | McLain, Jr. . |

*Primary Examiner*—Robert Beausoleil
*Assistant Examiner*—Raymond N Phan
(74) *Attorney, Agent, or Firm*—Mark P. Watson (57) ABSTRACT

A robot controller and its control method use a generic personal computer and a PC operating system. The controller 10 comprises the following: a task-switching unit 30 that switches tasks on a pre-emptive basis; an external interrupt generator 50 that uses an external timer to generate interrupts at specified fixed time intervals; an event drive unit 40 that performs event drive processing in synchronization with the interrupts generated by the external interrupt generator 50; an event registration unit 60 that registers the fact that the application program which performs processing in response to the occurrence of the event is waiting for the occurrence of the event; an event resource state storage unit 70 that stores event resource states in order to keep track of and recall the occurrence of events; an event resource state update unit 80 that updates the conditions of event resources stored in the event resource state storage unit 70; and a swap-out prevention unit 90 that prevents the swapping out of programs for which real time processing is required.

10 Claims, 5 Drawing Sheets

REAL TIME CONTROL METHOD FOR A ROBOT CONTROLLER

CROSS REFERENCE TO RELATED APPLICATIONS

This application is a divisional of application Ser. No. 08/876,697 filed Jun. 16, 1997 now U.S. Pat. No. 6,031,973, which is incorporated by reference herein in its entirety.

BACKGROUND OF THE INVENTION

1. Field of the Invention

This invention relates to a robot controller and its control method. In particular the invention relates to improved robot controllers using generic personal computer operating systems that execute the processing associated with the occurrence of events on a real time basis.

2. Description of the Related Art

Most conventional robot controllers and their control methods are designed to control the operation of specific manipulators such as SCARA-type manipulators and cartesian coordinate manipulators. For these purposes the conventional robot controllers employ independently developed robot control operating systems ("OS").

In recent years, however, there has been an increased demand for robot controllers that are capable of controlling the entire system, such as controlling peripheral devices or communicating with external devices, beyond controlling the operation of manipulators. In such cases, an OS that incorporates a multi-tasking function must be used as a robot controller OS. To meet this need either proprietary OS or generic real time operating systems (pSOS, VxWorks, VTRX, OS-9, etc.) are used in most cases.

It should be noted that "pSOS" is a registered trademark of Integrated Corporation, "VxWorks" is a registered trademark of WindRiver Systems Corporation, and "VRTX" is a registered trademark of MicroTech Research Corporation.

Because the control of manipulators and peripheral devices requires real time processing, an important requirement for a robot controller OS is the ability to ensure real time processing.

The development of proprietary operating systems capable of ensuring real time processing requires a vast amount of labor. On the other hand, while generic real time operating systems provide such real time processing capabilities, their high cost can be an economic drawback.

Recently, low-cost, high functionality personal computer operating systems have become available and are widely used. If such a personal computer operating system can be used for a robot controller, it is possible to achieve both substantial reductions in developmental labor and costs. This approach offers the additional advantages of ease of training from the standpoint of users, further reductions in developmental leadtimes because of the availability of a full complement of developmental tools, and the possibility of extending applications through the use of off-the-shelf hardware and software.

However, even though low-cost personal computers and PC-oriented operating systems offer multi-tasking capabilities, their task-switching operations are slow. A reduction in switching intervals is impossible, and it is therefore difficult to ensure real time processing.

As noted previously, because the control of manipulators and peripheral devices in a robot controller requires real time processing, if an operating system takes a long time between the occurrence of an event and the startup of the task that processes the event, the system falls short of being fully practical for a robot controller.

Another complicating factor is that, if any of the aforementioned personal computers or PC-oriented operating systems is used, the length of time between the occurrence of an event and the startup of the task that processes the event can vary greatly depending on the timing at which the event occurs. This fact tends to reduce the quality of the processing in terms of reproducibility.

OBJECTS OF THE INVENTION

Therefore, it is an object of the present invention to overcome the aforementioned problems.

Another object of the present invention is to provide high-speed task switching and a reduction in boot time or task startup time variability in the aforementioned personal computers and PC operating systems (so-called non-real time operating systems). A further object is to provide robot controllers developed with less manpower, having higher levels of functionality, improved ease of user learning, and greater expansion potential through the use of off-the-shelf hardware and software, while fully utilizing the various advantages inherent in the aforementioned personal computer operating systems.

A further object of the present invention is to provide a robot controller and its control method using a generic personal computer and a generic operating system for personal computers.

SUMMARY OF THE INVENTION

The robot drive controller of the present invention comprises a task-switching unit that includes a pre-emptive multi-tasking function and a real time control unit that effects control by commanding the task-switching unit to switch tasks so that the processing in response to the occurrence of an event is executed in real time. The real time control unit detects events on a regular basis at fixed time intervals that are short enough for the execution of real time processing. The robot drive controller comprises an event drive unit that performs event drive processing and directs the task-switching unit to switch to the task that executes processing associated with the detected event.

In the present context the term "pre-emptive" generally refers to the division of CPU processing into fixed time slices so that the OS assigns CPU time to applications according to a priority scheme. In other words, the term encompasses the case in which, before an application completes its processing and relinquishes the CPU, the OS seizes processing control at each unit time and switches the CPU to another application, i.e. pre-empts the unfinished application. Consequently, when multiple applications are executed in a pre-emptive multi-tasking scheme, it is not necessary for an application to wait until another application completes processing and releases the CPU. This substantially reduces the amount of wait time that the user experiences and thus improves the apparent efficiency of the computer.

In the present invention events are detected at fixed intervals so that the task that executes processing associated with an event can be driven in a timely manner. Therefore, by performing event drive processing at each interval that is short enough to handle events on a real time basis, the processing for handling events will be executed in real time.

The real time control unit of the present invention comprises an external interrupt generation unit that generates interrupt signals at the fixed intervals by using an external timer. The event drive unit performs the event drive processing in synchronization with the interrupt signals that are generated by the external interrupt generation unit.

In the real time control method of the present invention, processing that is associated with the occurrence of an event in a robot controller employs a generic operating system that includes a pre-emptive multi-tasking function. The control method comprises an external interrupt generation step that uses an external timer to generate interrupt signals on a regular basis at fixed time intervals that are short enough for the execution of real time processing. The control method further comprises an event drive step that detects events in synchronization with the interrupt signals that are generated in the external interrupt generation step and that performs event drive processing in which the generic operating system is directed to switch to the task that executes processing associated with the detected event.

In this manner, an external timer can be used to generate external interrupt signals at fixed time intervals sufficiently short to respond to the occurrence of events in real time. Therefore, by performing event drive processing in synchronization with the interrupt signals, even generic personal computers and generic operating systems for PCs that are not presently capable of ensuring the aforementioned fixed time intervals (by means of time slices or of internal interrupts using a system timer) can now control event-responding processing in real time.

In the present invention, the task-switching unit, comprises a time-slice unit that slices or divides time into the fixed time intervals, and the event drive unit unilaterally performs event drive processing in each time slice or interval created by the time slice unit.

Similarly, in the method of the present invention, the event drive step performs the event drive processing in each of the time slices or intervals created by the time slice unit.

In this manner, the event drive processing can be implemented as a task that is unilaterally processed in each time slice. Consequently, event-responding processing can be controlled so that it is executed in real time in a simple configuration.

In the present invention the real time control unit comprises an event registration unit that registers the fact that a program or task that executes the processing associated with the occurrence of an event is waiting for the occurrence of such event. The event drive unit, when it detects the occurrence of the event registered by the event registration unit, directs the task-switching unit to switch to the particular task which has been waiting for the occurrence of the event registered by the event registration unit.

Similarly, the method of the present invention further comprises an event registration step that registers the fact that the program or task that performs processing in response to the occurrence of an event is waiting for the occurrence of such event. The event drive step, when it detects the occurrence of an event registered in the event registration step, directs the generic operating system to switch to the particular task that is waiting for the occurrence of the event registered in the event registration step.

In this manner, a dynamic association can be established between events and the programs that perform the processing corresponding to the event, and this ensures the effective utilization of system resources. Furthermore, by resetting the event-wait state at the conclusion of event drive processing, it is possible to keep track of event wait states and event-wait release actions in real time.

In the present invention the real time control unit and method treat at least one of the following as an event: a change in the hardware resources of a robot controlled by the robot controller or an output data group which enables the program that controls manipulator actions or peripheral devices to perform synchronization and communication.

The hardware resources include, for example, I/O ports, I/O ports that are mapped to memory, robot manipulators, system I/O units that are mounted in a drive box, and special circuit boards that are connected to an ISA bus. The term "program" refers to user tasks that control manipulator operations and peripheral devices, and programs that are executed in system tasks that monitor the internal states of controllers, among other things.

Thus, by treating the various conditions that occur in a robot as events, it is possible to perform the processing corresponding to these events in real time.

In the present invention the real time control unit comprises an event resource state storage unit that stores, in a shared memory area that can be referenced and updated by multiple tasks, memory event resource states in order to keep track of at least one of the following: a change in the hardware resources or the output data which enables the program that controls manipulator actions or peripheral devices to perform synchronization and communication. The real time control unit further comprises an event resource state update unit that updates the event resource state stored in the event resource state storage unit, based upon at least one of the following: the manipulator operations or the output data group that enables the program that controls peripheral devices to perform synchronization and communication. The event drive unit comprises a hardware resource update unit that updates hardware resources based upon an event resource state that has been updated by the event resource state update unit.

The method of the present invention comprises an event resource state update step that stores, in a shared memory area that can be referenced and updated by multiple tasks, memory event resource states in order to keep track of at least one of the following: a change in the hardware resources or the output data which enables the program that controls manipulator actions or peripheral devices to perform synchronization and communication. An event resource state update step performs updating based upon at least one of the following: manipulator operations or the output data group that enables the program that controls peripheral devices to perform synchronization and communication. The event drive step comprises a hardware resource update step that updates hardware resources based upon the even resource information that has been updated by the event resource state update step.

The present invention provides an event resource table that stores the conditions of event resources in a shared memory area that can be referenced and updated by multiple tasks. The applicable area in the event resource table corresponding to the conditions of event resources that are changed by the output from programs that are processed in the various tasks is updated. Therefore, by referencing the event resource table, it is possible to detect events that result from program outputs. This permits an efficient detection of events.

Further, because the actual hardware resources can be updated based upon changes in the event resources as reflected in the event resource table, the programs that are executed in various tasks need not update the actual hardware resources. Therefore, the integration of the hardware resource update processes results in an increased processing speed.

The present invention further comprises a swap-out prevention unit that prevents the swapping out of a particular program by directing the task-switching unit to start the particular program, which particular program has registered the fact that it is waiting for the occurrence of an event, on a regular basis and at specified time intervals.

The method of the present invention comprises a swap-out prevention step that prevents the swapping out of a particular program by directing the generic operating system to start the particular program, which particular program has registered the fact that it is waiting for the occurrence of an event, on a regular basis at specified time intervals.

Normally programs in a robot control system that have registered the fact that they are waiting for the occurrence of an event must be processed in real time when the event occurs. However, if the program has been swapped out by a generic operating system, the reloading of the program takes tens or even hundreds of milliseconds. The processing scheme developed in the present invention, however, starts the programs that are waiting for the occurrence of an event on a periodic basis regardless of whether there is an actual processing request. This prevents the swapping out of the program and thus can assure the execution of real time processing.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The following describes an embodiment of the present invention with reference to the drawings. The robot controller of the present embodiment controls manipulator actions and/or peripheral devices. This type of manipulator operation or peripheral device control can be customized to suit user-specific controls. Therefore, the user writes application programs for the operations to be executed by the manipulators connected to the controller in robot control languages that can be executed by the controller. The controller is configured so that user tasks contained in user-written manipulator control application programs and tasks that perform system processing to monitor the internal state of the controller can be executed on a multi-tasking basis.

Figure 3:
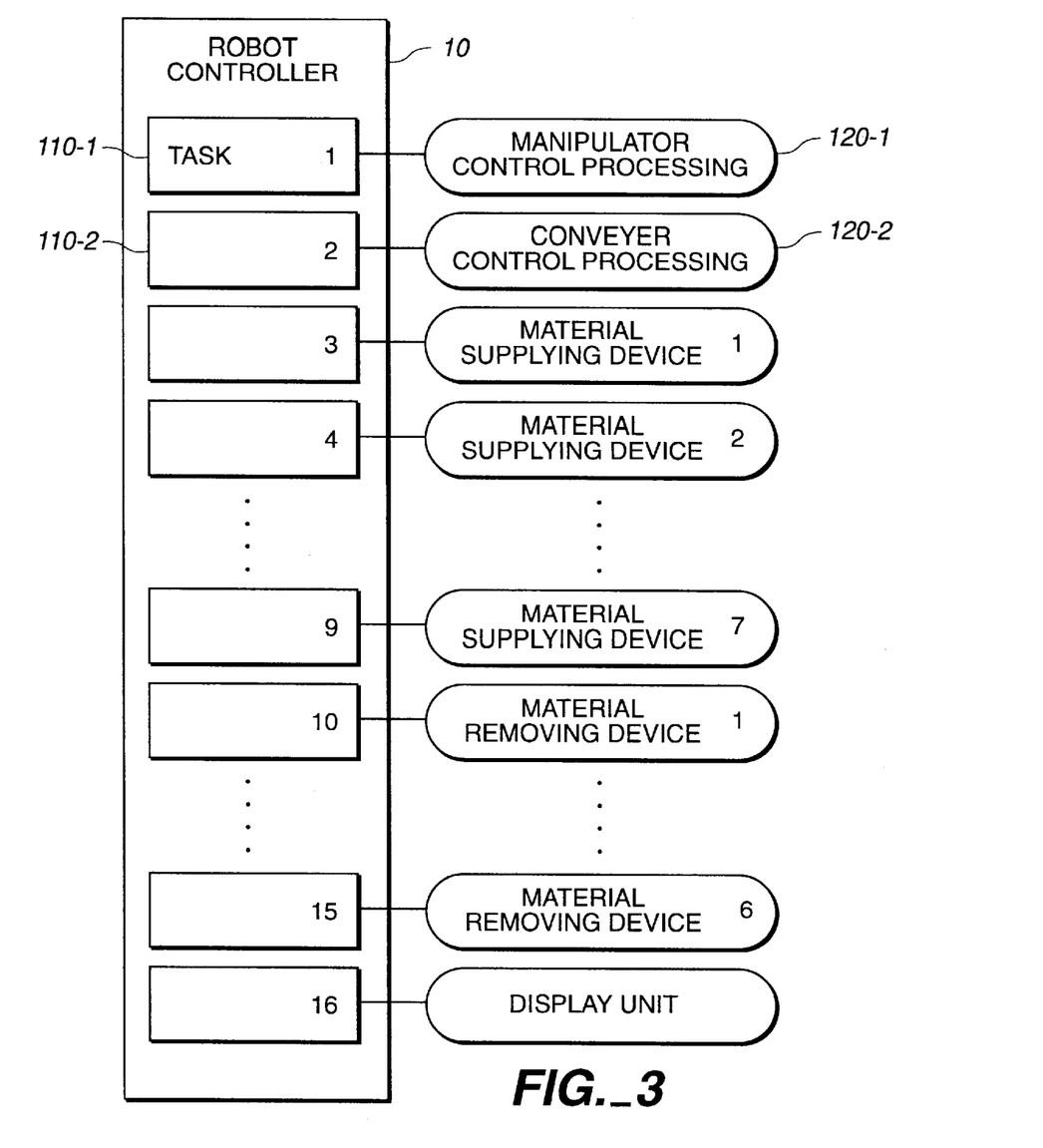
FIG. 3 is a diagram of an example of multi-tasking processing performed by the controller of the present invention.

FIG. 3 is a block diagram that shows an example of multi-tasking processing that the controller 10 performs. As shown in the figure, the controller is configured so that programs that contain the applications for controlling the manipulator control processing 120-1, conveyer control processing 120-2, and so forth, are executed on a multi-tasking basis as tasks 110-1, 110-2, and so forth. Specifically, CPU time is time-sliced or divided and allocated to a plurality of tasks so that, in appearance to the user, multiple tasks are executed concurrently. As shown in FIG. 3, other programs can include applications for controlling external devices that supply material to be manipulated (e.g. material-supplying devices 1, 2, etc.) or devices that remove material that has been manipulated and/or processed (e.g. material-removing devices 1, 2, etc.) or for controlling other peripheral devices such as a display unit.

In a robot controller, control of the manipulators and the peripheral devices by various programs must be executed in real time. Therefore, if it takes a long time between the occurrence of an event and the starting time of the task that processes the event, the controller will not be very useful for practical applications.

The robot controller 10 in the present embodiment incorporates the following configuration so that the processing that accommodates various events can be executed in real time.

Figure 2:
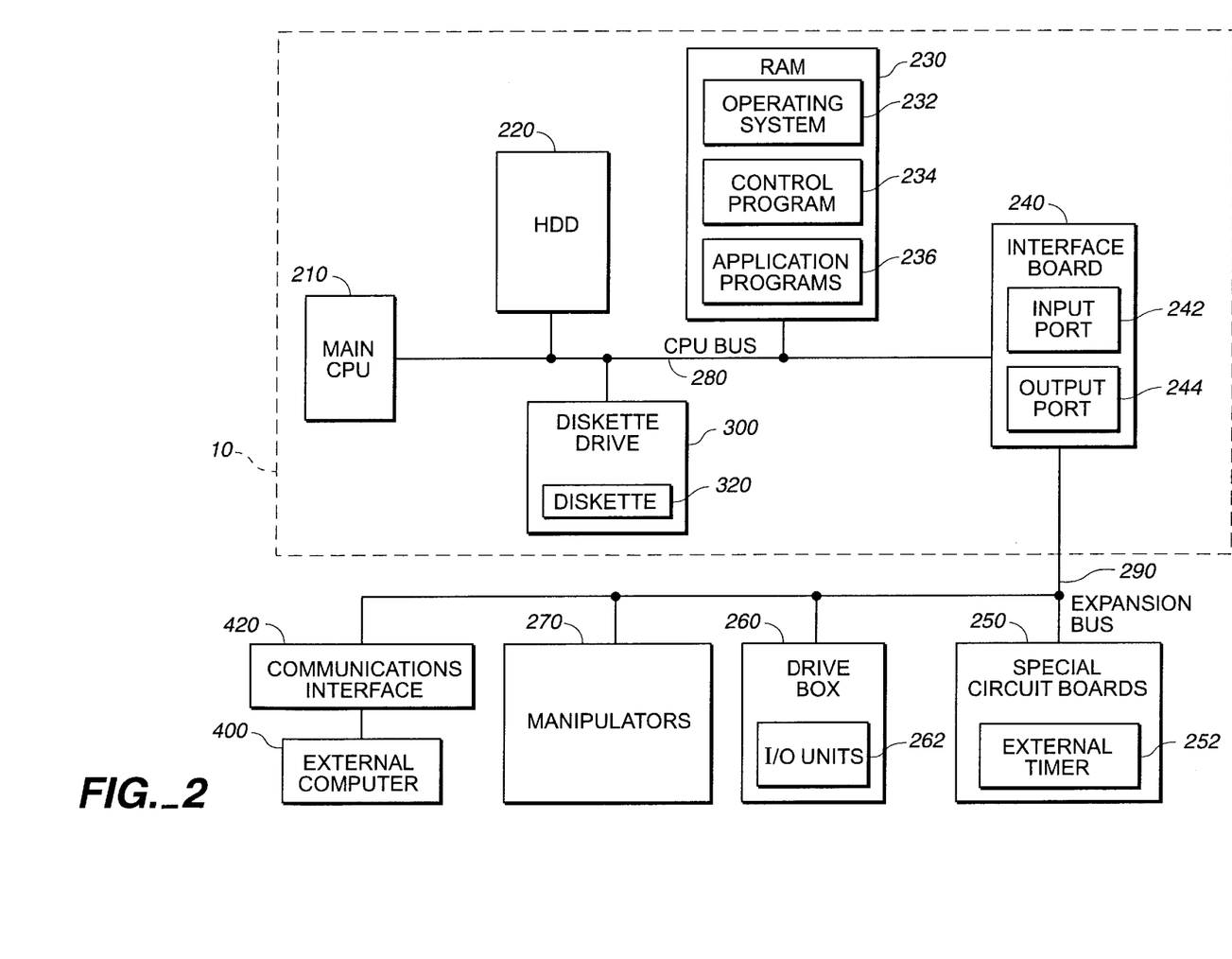
FIG. 2 is a block diagram the hardware features of the robot controller of the present invention.

First, the requisite hardware configuration of the system will be described. FIG. 2 shows the hardware configuration of the present system.

As shown in the figure, in the controller 10 the main central-processing-unit CPU 210, the hard-disk-drive HDD 220, the random-access-memory RAM 230, and the interface board 240 are connected by the CPU bus 280. Furthermore, a drive box 260, in which manipulators 270 and input/output I/O units 262 are mounted, and special circuit boards 250, that contain an external timer 252 among other things, are connected to the interface board 240 by the expansion bus 290.

RAM 230 holds an operating system 232 that controls the controller, a control program 234 that executes the processing associated with events, and various programs and data including user created robot control application programs 236.

The operating system 232 is comprised of a generic personal computer OS, which is a general-purpose personal computer operating system that supports standard functions such as pre-emptive multi-tasking and event synchronization. However, this is not a real time OS since it performs task switching at low speeds and does not set short switching times; consequently the OS is not capable of performing real time processing. It should be noted that the present embodiment uses Windows 95 (a registered trademark of Microsoft Corporation) as a generic personal computer operating system, which is well known in the art and therefore not described in detail herein.

Figure 1:
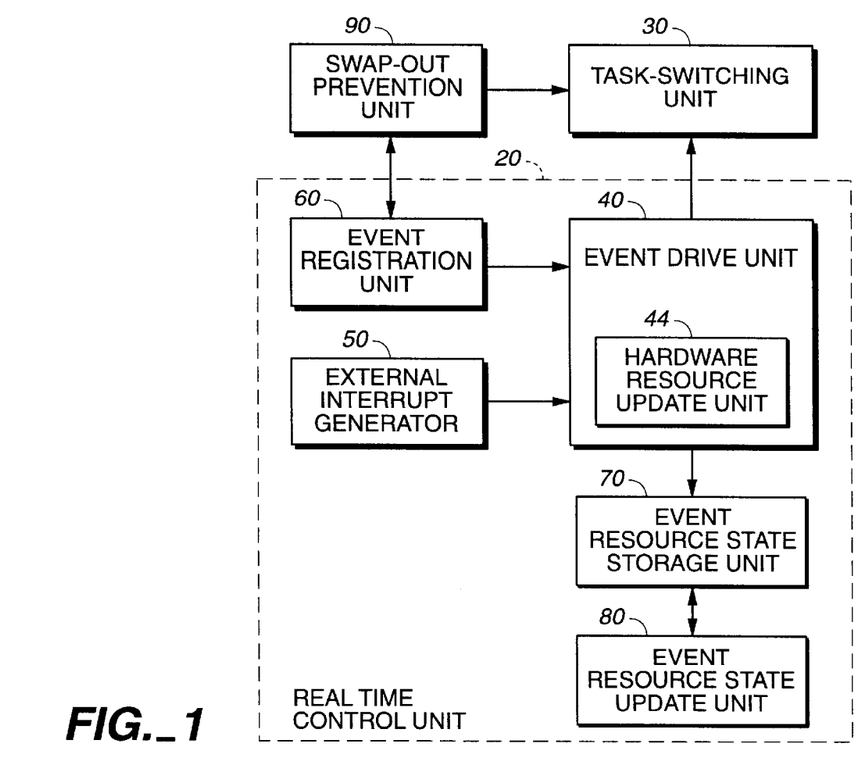
FIG. 1 is a functional block diagram of key features of the robot controller of an embodiment of the present invention.

The control program 234 comprises various programs and storage areas that implement an event drive unit 40, to be described later, a hardware resource update unit 44, an event registration unit 60, an event resource state storage unit 70, an event resource state update unit 80, and a swap-out prevention unit 90. These units are shown in FIG. 1.

The task-switching unit 30, to be described later, is principally implemented by the task-switching function of the operating system 232. Similarly, the event drive unit 40 and the event registration unit 60 are implemented in part by the event synchronization function of the operating system 232.

The application program 236 refers to a user-written program, coded in a robot control language, that describes the operations to be performed by manipulators.

An event refers to one of the various events that occur during the operation of a manipulator or during control of a peripheral device. Specifically the term encompasses events, occurring in manipulators 270 or the drive box 260, that are associated with changes in the system I/O units 262, events that are associated with changes in hardware resources such as circuit boards 250, and events that are produced by the output data that is used by programs 232, 234, and 236 for the purposes of inter-task synchronization and communication. The system I/O units, the hardware resources, and the output data that generate events are called event resources.

The following explains the features that enable the controller 10 to execute event-associated processing on a real time basis.

FIG. 1 is a functional block diagram of a portion of the controller 10 which may be implemented in software, hardware or a combination of both. The portion of the controller 10 comprises the following: a task-switching unit 30 that switches tasks on a pre-emptive basis; an external interrupt generator 50 that uses an external timer to generate interrupt signals at specified fixed time intervals; an event drive unit 40 that performs event-drive processing in synchronization with the interrupt signals generated by the external interrupt generator 50; an event registration unit 60 that registers the fact that an application program 236 which performs the processing associated with the occurrence of an event is waiting for an event occurrence; an event resource state storage unit 70 that stores event resource states in order to recall and keep track of the occurrences of events; an event resource state update unit 80 that updates the states of event resources which are stored in the event resource state storage unit 70; and a swap-out prevention unit 90 that prevents the swapping out of the application program 236 which is waiting for the occurrence of an event.

The external interrupt generator 50, the event drive unit 40, the event registration unit 60, the event resource state storage unit 70, and the event resource state update unit 80 function as real time control means 20. These components control and direct the task-switching unit 30 to switch tasks so that the processing associated with the occurrence of an event can be executed in real time.

Further, the event drive unit 40 includes a hardware resource update unit 44 so that specified hardware resources, to be described later, are updated based upon the information updated by the event resource state update unit 80.

The external interrupt generator 50 uses an external timer 252 which generates a clock signal and which is mounted on the circuit boards 250 connected to the expansion bus 290, to generate interrupt signals periodically at fixed time intervals in response to the clock signal. In the present context the term "fixed time interval" refers to the short time interval necessary for the startup on a real time basis of the program that processes the event. In the present embodiment the interval is set at 1 msec.

As noted previously, the operating system 232 stored in RAM 230 of the controller 10 is not a real time OS. Therefore, it cannot slice or divide time into short enough time intervals to detect event-processing programs within the system. Therefore, the present embodiment uses an external timer 252 to generate interrupt signals at fixed time intervals in order to achieve the same effect as the generation of 1-millisecond time slices.

When the operating system 232 performs processing in response to the occurrence of an event and issues an event-wait request, the event registration unit 60 registers the fact that the application program 236 is waiting for the occurrence of an event. The application program 236 refers to any of the programs that are executed on a multi-tasking basis in order to control the manipulator control processing 120-1, the conveyer control processing 120-2, and so forth that are shown in FIG. 3. The program is stored in RAM 230 as indicated in FIG. 2. The occurrence of an event refers to a change in an event resource as noted previously.

In order to start the application program 236, executed on a multi-tasking basis in response to a change in an event resource, it is necessary to associate event resources and the programs that wait for their changes. Therefore, when there is a condition in which the application must wait for a change in an event resource, each application program 236 requests the event registration unit 60 to register the fact that the program is waiting for the occurrence of an event.

Upon receipt of this request, the event registration unit 60 associates the event resource with an event object and registers the fact that the program is waiting for the occurrence of an event. In the present context the term "event" refers to any of the various events noted previously. An "event object" refers to the unit by which the system keeps track of the various events. In other words, the system keeps track of event objects which are uniquely associated with each event resource, and each event object has an assigned event handle as its own ID.

The function by which the system can keep track of events and event objects can be implemented through the use of the standard event synchronization function of the operating system 232.

Specifically, the registration process is performed as follows: the event registration unit 60 generates an appropriate number of event objects during system initialization.

When an event registration request is generated by the application program 236, any unused (not already associated with an event resource) event objects are assigned to event resources. If a registration request is generated by another application program 236 with reference to an already registered event resource, the event object previously associated with the event resource is used instead of a new event object being assigned. In the present context the term "use" means that when an event handle or ID is returned to an application program, as will be explained later, the handle for the event object is also returned to the other application program. The term "use" also encompasses the generation of a new event object if the system runs out of previously generated event objects.

As will be described later, the event registration unit registers the event object to be used during dummy booting in order to prevent swapping-out of an application program 236 that is waiting for the occurrence of an event. For this purpose the event registration unit uses an independently generated event object for each application program. The event registration unit assigns this event object to any application program 236 that has generated an event-wait registration and starts the program on a dummy basis.

Upon completion of the registration process, the event registration unit 60 returns the event handle, which is the ID for the event object, to the application program 236 that requested a registration. As a result, the application program 236 receives both the event handle for an event object associated with an event resource and the event handle for an event object for a dummy startup.

Subsequently the application program 236 requests the operating system 232 to start it when there is a change in the event object indicated by the event handle. This ensures that the programs can be in a standby status until such time as there is a change in the event resource registered as an event object or until a dummy startup process is executed in order to prevent any swapping-out.

The correspondence between an event resource and an application program is established when an event handle is returned to the application program. This correspondence establishment process relies on the use of the event synchronization function which is a standard feature of the operating system. Specifically, the event synchronization function puts the event object in a signaled state so that the tasks for all programs that have the corresponding event handle can be started.

Figure 4:
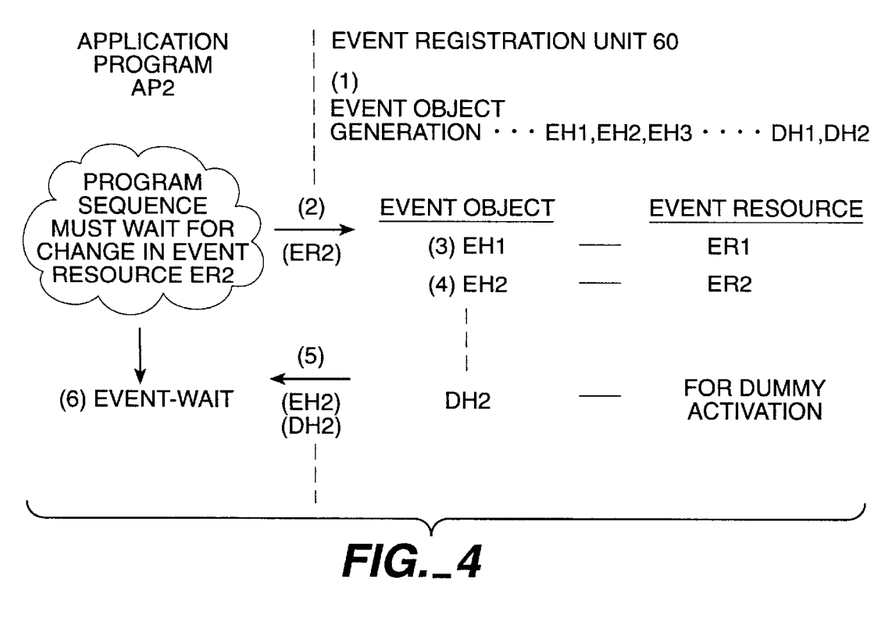
FIG. 4 illustrates an example of the event registration process of the present invention.

FIG. 4 shows a specific example of the event registration process. As noted previously, during system initialization the event registration unit 60 generates an appropriate number of event-identifying event objects (with corresponding event handles EH1, EH2, EH3, . . . ) for application programs in order to identify events and dummy-startup event objects (with corresponding event handle DH1, DH2, . . . ) for each application program (1).

When a situation that requires an application program to wait for a change in an event resource ER2 occurs during the execution of a task associated with an application program AP2 (for example), the application program AP2 issues a registration request to the event registration unit 60 (2). In this process the program passes the event resource ER2 as an argument to the event registration unit 60. Because an event object (having event handle EH1) is already assigned to the event resource ER1 (3), the event registration unit 60 assigns another event object (having event handle EH2) to the event resource ER2 (4), and returns the event handle EH2 of the event object and the event handle DH2 of the dummy-processing event object to the application program AP2 (5). The application program AP2 requests the operating system 232 to wait until the event handle EH2 and the event object indicated by DH2, both of which have been returned by the event registration unit 60, assume the signaled state (6).

In the dummy startup for the swap-out process, however, only the dummy processing is performed so that the program will not be swapped out. Therefore, the registration and execution of the dummy startup process is transparent when the user creates an application program.

A plurality of event resources per application program can also be registered simultaneously. For example, if an application program waits for changes in multiple event resources (ER1, ER3, ER4), registration requests can be issued to the event registration unit 60 by using these event resources as arguments.

Because an event object EH1 is already associated with the event resource ER1, no new event objects are assigned to the event resource. An unused event object ER3 (with associated event handle) is assigned to the event resource ER3. If there are no event objects that can be assigned to the event resource ER4, a new event object EH4 (and associated event handle) is generated and assigned.

The event handles EH1, EH3, and EH4 for the assigned event objects, as well as the event handle DH for a dummy event object, are returned to the application program.

The event resource state storage unit 70 is provided in a shared memory area that can be referenced and updated by tasks. The event resource state storage unit holds an event resource table which stores the conditions of event resources.

The event resource table, as noted previously, is configured to hold the hardware resource conditions for the system I/O units 262 and the circuit boards 250, conditions which have occurred in the manipulators 270 and the drive box 260, as well as the output data group that enables programs 232, 234, and 236 to perform inter-task synchronization and communication.

The conditions of event resources stored in the event resource table are updated by the event drive unit 40 at regular time intervals and by the event resource state update unit 80 as needed which will be described later.

When requested principally by the application program 236, the event resource state update unit 80 updates the conditions of the output ports and those of the output data group that are used for the synchronization and communication between tasks.

The aforementioned request is issued in the manner in which an application program 236, during its execution, calls a function that starts the event resource state update unit 80. For this purpose the application program passes the output data group as an argument.

Normally, the application programs 236 pass and receive the output data group to and from one another. In the present embodiment, however, if an output data group that must be exchanged between application programs arises, a request for an output data group exchange is issued to the event resource state update unit 80. Upon receipt of the request, the event resource state update unit 80 updates the condition of the applicable event resource in the event resource state storage unit 70.

Therefore, application programs 236 do not update the output ports 244 that would normally be updated with the actual generation of an output data group. These output ports are configured so that they are updated on an integrated basis by the hardware resource update unit 44 as will be described later.

The event drive unit 40 performs event drive processing in synchronization with the interrupt signals that are generated by the external interrupt generator 50. The "event drive processing" refers to the process of detecting events regularly at the fixed time intervals necessary for the execution of real time processing and of indicating to the task-switching unit 30 that control must be switched to the task that executes processing associated with the detected event.

This event drive processing by the event drive unit 40 occurs when the CPU 210 executes both the control program 234 stored in RAM 230 and the event synchronization function of the operating system 232. The control program 234 that implements the function of the event drive unit 40 is resident in the system. The task that performs the processing is driven in synchronization with the interrupt signals that are generated by the external interrupt generator 50. As will be explained later, the event drive unit is configured in such a way that when the program corresponding to a given event is started, the event synchronization function of the operating system 232 is used. To detect events, the event drive unit 40 monitors the event resources by employing different monitoring methods for detecting event resource changes for different devices. For the input port 242, one defines in advance the port addresses and the address sizes to be monitored. Once this is done, the event drive unit, in synchronization with the interrupt, references all defined input ports and stores the current condition of the input port 242 in the applicable area in the event table that is stored in the event resource state storage unit 70. For detecting an event the event drive unit compares the condition of the referenced input port 242 with the previous condition stored in the event resource table.

With regard to the other devices, such as manipulators 270, the system I/O units mounted in the drive box 260, and the special circuit boards 250 connected by the expansion bus 290, the event drive unit monitors them by calling the separate device drivers. It stores the current conditions of the robot system unit 270, the system I/O units, and the special circuit boards 250 in the applicable area in the event table that is stored in the event resource state storage unit 70. For detecting an event, the event drive unit compares the results of the monitoring performed by calling the device drivers with the previous condition stored in the event resource table.

With regard to the output data group for various application programs 236, normally the occurrence of an application program is reflected in the output port 244.

Subsequently, when there is an event resource registered in the event registration unit 60 that is among the event resource changes that have been detected, the event drive unit 40 directs the task-switching unit 30 to start the task associated with the application program 236 by putting the event object in the signaled state.

If two or more application programs are waiting for a change in the same event resource or if changes occur simultaneously in multiple event resources, the one or more corresponding event objects assume the signaled state. After that, the operating system switches the processing of the application programs in a round-robin fashion.

As noted above, because the application program 236 does not actually update the output port 244 when updating the event resource table, the event resource table needs to be updated. Therefore, when an output data group is generated in an application program, the hardware resource update unit 44 updates the actual, corresponding output port 244.

The system is configured so that the size of the output data group and the output address of the actual output port 244 for the application programs 236 that are necessary for the update process can be registered in advance.

The task-switching unit 30 switches to any task at prescribed time intervals in order to execute the processing on a multi-tasking basis. The task-switching unit also switches to a task when either the event drive unit 40 or the swap-out prevention unit 90 indicates the start of the task for the corresponding application program 236 by putting an event object in the signaled state.

The controller 10 performs the task-switching by using the standard time slice function available in the operating system 232 in order to execute the processing on a multi-tasking basis.

Task switching is implemented by starting the task for the application program 236 that has the event handle corresponding to the event object that has been put into the signaled state. This is accomplished when the CPU 210 executes the event synchronization function of the operating system 232 stored in RAM 230.

As noted above, when multiple application programs wait for a change in the same event resource or when there are changes in multiple event resources at the same time, the corresponding one or more event objects are placed in the signaled state. This enables the task-switching unit 30 to start the application programs having the corresponding event handles on a round-robin basis.

When an event is registered, the event object and the application program are associated with each other by the standard event synchronization function that is provided by the operating system. Therefore, by placing an event object in the signaled state, one can start the task for the application program 236 that has the corresponding event handle.

Figure 5A:
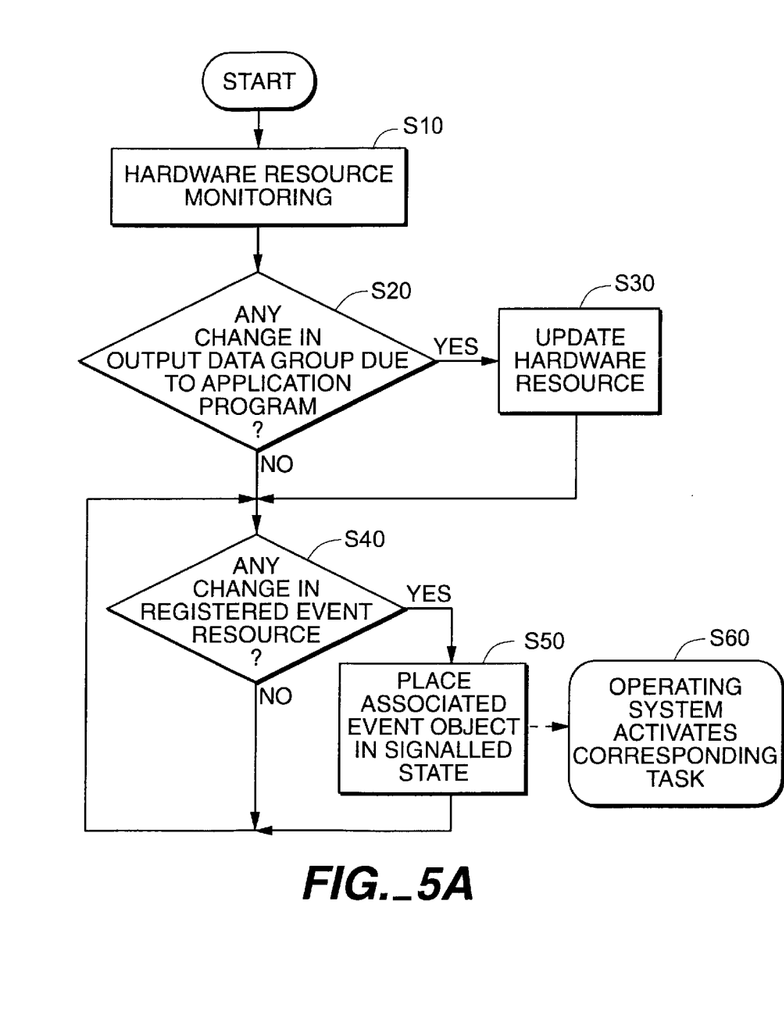
FIGS. 5A and 5B are flowcharts that describe the procedure by which the system of the present invention drives events in real time.
Figure 5B:
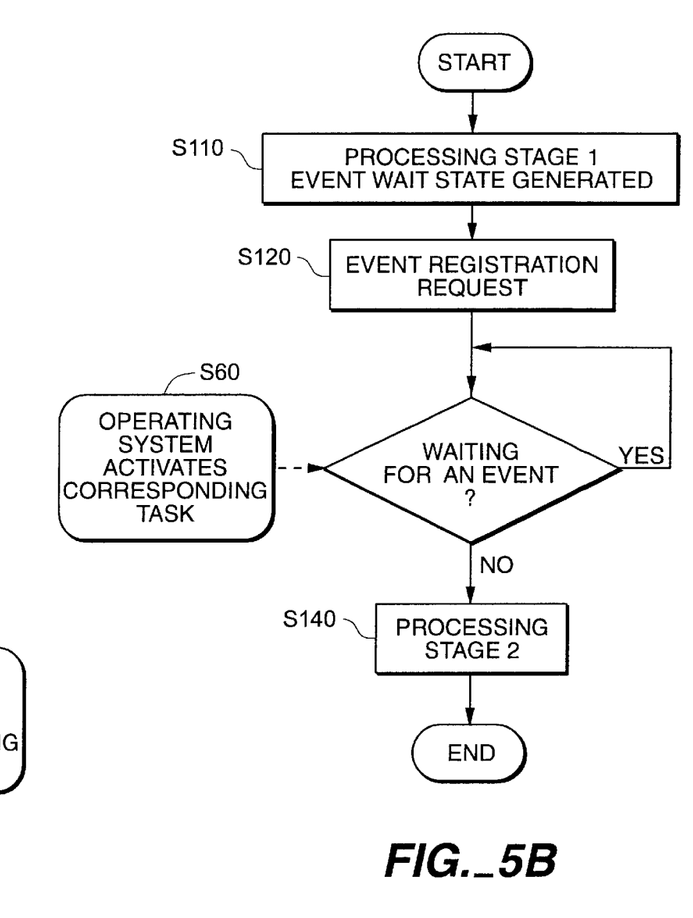

FIGS. 5A and 5B are flowcharts that show the procedure by which the system drives events on a real time basis. FIG. 5A shows the procedure for the event drive processing occurring periodically at fixed time intervals by the event drive unit 40. FIG. 5B shows the procedure by which the event-driven application programs 236 operate.

As shown in FIG. 5B, when a task for an application program 236 is started and an event wait state is generated during the execution of processing stage 1 (Step 110), the application program 236 specifies the event resource to the event registration unit to request the registration of the event-wait state (Step 120), and as a result the application program enters into the event-wait state (Step 130). Thus, the event resource, a change in which is waited for by the application program 236, is registered in correspondence with an event object. The application program 236 receives the event handle corresponding to the event object, and waits until the event object assumes the signaled state.

As shown in FIG. 5A, the event drive unit 40 monitors the various hardware resources described above (Step 10). When there is a change in the output data group due to the application program (AP), which is an event resource registered as an event object in the aforementioned event resource table (Step 20), the hardware resource update unit 44 of the event drive unit 40 actually updates the output port 244, which is the corresponding hardware resource (Step 30).

When there is a change in a registered event resource (Step 40), the event object corresponding to the event resource that was registered by the event registration unit 60 is placed in the signaled state (Step 50). When the event object has entered into the signaled state, the operating system 232, which contains the function of the task-switching unit 30, starts the task in which the application program having the corresponding event handle is executed (Step 60).

When this occurs, the application program 236, which has been waiting for the occurrence of an event as indicated by the event handle, begins the execution of processing stage 2 (Step 140) as shown in FIG. 5B.

If an application program, the processing of which must be executed in real time, is waiting, the swap-out prevention unit 90 starts the application program on a periodic basis so that the application program will not be swapped out.

Application programs that require real time processing are ones which are waiting for the occurrence of an event. If these application programs are swapped out and they are driven after an event has occurred, the reloading of the requisite program requires tens or even hundreds of milliseconds of time, thus reducing the system's ability to respond to events in real time.

Therefore, the swap-out prevention unit 90 directs the task-switching unit 30 to start the application program associated with a dummy activation event object in the event registration unit 60 at specified time intervals. For this purpose, specified time intervals are generated through the use of the system timer. The swap-out prevention unit provides instructions to the task-switching unit 30 as described below.

When an application program requests the event registration unit 60 to register the fact that it is waiting for a change in an event resource, the event handle for the dummy-processing event object is returned to the application program as described above. The swap-out prevention unit 90 periodically puts the dummy-processing event object in the signaled state in order to direct taskswitching unit 30 to start the task for the application program that has the corresponding event handle.

The application program can determine whether a given task is driven by the swap-out prevention unit 90 or by the event drive unit 40 from the type of the event object. If the task is driven by the swap-out prevention unit 90, the application program performs dummy processing and waits for the occurrence of an event. This type of processing which is to be performed by the application program should be provided for by the control program as a function to be called by the application program when the application program registers the fact that it is waiting for the occurrence of an event. In this way, when creating an application program, the user need only use the function without concerning himself with the intricacies of the mechanism involved.

These features can implement the following characteristics which are superior to what is available in conventional products:

The length of time required from the occurrence of an event until the corresponding program is started is short, and the variability is low. This results in a high degree of precision reproducibility in the repeated robot operations or in the operations of other control equipment that are coded by a user. Suppose, for example, that a sensor detects the position of an object on a conveyor and a robot begins its operation based upon the sensor's signal. If there is a significant variability from the time a sensor input is effected until the robot operation begins, not only does it take a great deal of work to adjust the entire system, but in some cases the robot may fail to operate the conveyor-mounted object properly.

In a real time system with a limited processing capacity, an increase in the number of tasks that are executed concurrently can lead to a rapid increase in the length of time from the occurrence of an event to the time when the corresponding processing is performed, and this results in a significant drop in the system's responsiveness. In contrast, this system, because of its high real time processing capacity, can support a large number of concurrently executed tasks. In the present embodiment 32 tasks can be executed simultaneously in the robot language in which users write programs.

With regard to events that can be registered in the system, not only ordinary events, such as an I/O signal turning on and off, but also complex conditions can be registered as events such as a robot assuming a certain orientation through the use of an event resource table, a variable in the program taking a certain value, or combinations of these conditions in the form of logical expressions.

By implementing a robot controller by combining a personal computer, e.g. an IBM PC, with Windows 95 (a registered trademark of Microsoft Corporation) as in the preferred embodiment, it is possible to use the wealth of low-cost expansion boards (network connection boards, instrumentation connection boards, and generic I/O boards) that are available from commercial sources.

Furthermore, application programs can be developed using commercially available programming languages (Visual C++, Visual Basic, and so forth) in addition to conventional robot languages which are well known. The software operating method that implements the present invention is based on Windows 95 (a registered trademark of Microsoft Corporation) operating methods. Any users familiar with other applications (word-processors, spreadsheets, and so forth) running on Windows 95 (a registered trademark of Microsoft Corporation) can easily learn how the robot operating procedures work according to the present invention.

Even though the preferred embodiment uses Windows 95 (a registered trademark of Microsoft Corporation) as a generic personal computer OS as an example, other personal computer generic operating systems can also be used.

The present invention is by no means limited to the explanation given in the above embodiments; other embodiments are also possible.

The following describes an embodiment of a robot controller 10 that employs a generic PC operating system capable of performing real time processing.

The term "capability to perform real time processing" refers to an operating system in which task-switching by the OS can be performed rapidly. This type of operating system can generate sufficiently small time intervals by means of a system timer, and time-slicing can be performed in short enough time intervals to permit real time controls.

In this embodiment, the generation of interrupts by an external timer in the external interrupt generator 50 in the prior embodiment is replaced by a system timer for time-slicing or division, and all other facets can be implemented in the same manner as the prior embodiment.

In this embodiment, time intervals can be set in the system timer that are short enough to permit real time controls. Consequently, the need for the external timer illustrated in the hardware configuration diagram of FIG. 2 is obviated.

The following explains an example of the present embodiment.

Figure 6:
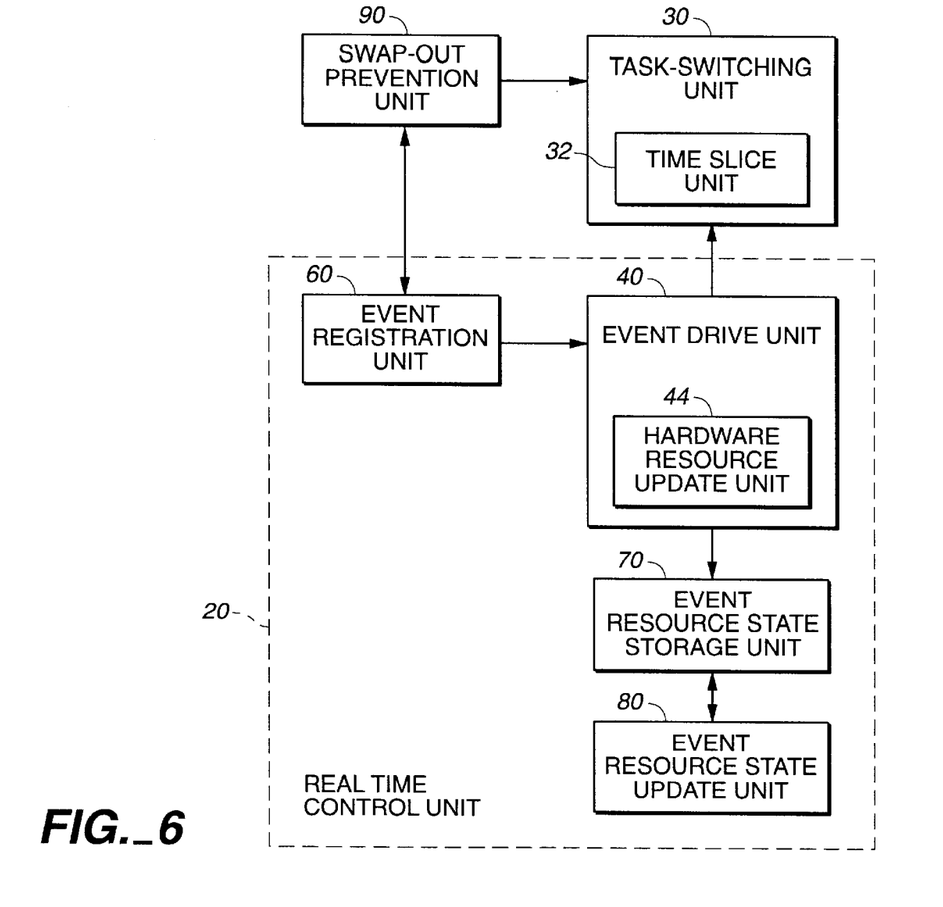
FIG. 6 is a functional block diagram of key features of the robot controller of another embodiment of the present invention.

FIG. 6 is a functional block diagram of a robot controller 10 that employs an operating system with a real time processing capability. This figure differs from FIG. 1 in that the task-switching unit 30 includes a time-slice unit 32 instead of the external interrupt generator 50. All other components are assigned the same names and numbers as in FIG. 1. An explanation of the functions that are similar to those in FIG. 1 is omitted.

The time-slice unit 32 slices or divides time into time intervals short enough to permit real time controls, e.g., 1 millisecond each. It allocates CPU time to tasks in a round robin fashion in order to start up the tasks. For each time slice, the time-slice unit drives the event drive unit 40 prior to the execution of a given task.

The control program 234 that implements the functions of the event drive unit 40 is executed as a task that is unilaterally processed on a time-slice-by-time-slice basis. Because the event drive processing by the event drive unit 40 finishes within one millisecond, if no events have occurred the ordinary time slice-based task activation is effected during the remaining time available in the time slice.

In all other respects this embodiment can implement the functions of a robot controller in exactly the same way as in the first embodiment.

Although this embodiment illustrates the use of a standard event synchronization function that is provided by the system, any event synchronization function can be used so long as it produces the same effects. In other words, functions that can be executed by the system or by system calls can be employed. Alternatively, control programs can also be developed that produce the same effects as the event synchronization function.

Although the present embodiment depicts the case in which the operating system 232 and the control program 234 for the controller 10 are stored in RAM 230, the program of instructions for carrying out the present invention can also be stored in a detachable external storage medium such as diskette 320, which can be loaded into and read by floppy disk drive 300 connected to CPU bus 280. Also, the program of instructions for carrying out the present invention can be loaded from an external storage medium such as floppy diskette 320 into an internal storage medium such as RAM 230 or from an external device such as external computer system 400 into an internal storage medium such as RAM 230 by means of communications interface 420 connected to expansion bus 290.

Additionally, the present invention is by no means limited to specific robot types or configurations; it is applicable to a wide variety of robot controllers.

Although the present embodiments describe a robot controller system, a robot sequencer using the same configuration can also be constructed. Therefore, the application of the present invention to a robot sequencer is within to the scope of the present invention.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A real time control method for executing processing associated with occurrences of events in a robot controller utilizing a generic operating system having a pre-emptive multi-tasking function comprising:

using an external timer to generate interrupt signals on a regular basis at fixed time intervals sufficient for the execution of real time processing; and detecting events in synchronization with said interrupt signals that are generated in said external interrupt generation step and performing event drive processing whereby said generic operating system is directed to switch to a task which executes processing associated with an event detected in said detecting step.

2. The control method of claim 1, further comprising:

registering an event, an occurrence of which is being waited for by a program that executes processing associated with said event occurrence;

detecting the occurrence of an event registered in said event registration step; and directing said generic operating system to switch to a task which executes a program that is waiting for occurrence of said event registered in said event registration step.

3. The control method of claim 2 further comprising preventing swapping out of a program by directing said generic operating system to start a program, on a regular basis at specified time intervals said program having registered the fact that it is waiting for the occurrence of an event.

4. The control method of claim 1, wherein said detected events include at least one of a change in hardware resources of a robot controlled by said controller, a change in output data which enables a program for controlling manipulator actions, and a change in output data which enables peripheral devices to perform synchronization and communication.

5. The control method of claim 4, further comprising:

storing in a shared memory area that can be referenced and updated by multiple tasks, event resource states in order to keep track of said detected events;

updating said event resource states stored in said shared memory based upon changes in said detected events; and updating a hardware resource based upon event resource states that have been updated in said event resource state update step.

6. A medium readable by a machine embodying a program of instructions executable by said machine to perform a real time control method for executing processing associated with occurrences of events in a robot controller utilizing a generic operating system having a pre-emptive multi-tasking function, said control method comprising the steps of:

using an external timer to generate interrupt signals on a regular basis at fixed time intervals sufficient for the execution of real time processing; and detecting events in synchronization with said interrupt signals that are generated in said external interrupt generation step and performing event drive processing whereby said generic operating system is directed to switch to a task which executes processing associated with an event detected in said detecting step.

7. The medium of claim 6 wherein said control method further comprises:

registering an event, an occurrence of which is being waited for by a program that executes processing associated with said event occurrence;

detecting the occurrence of an event registered in said event registration step; and directing said generic operating system to switch to a task which executes a program that is waiting for occurrence of said event registered in said event registration step.

8. The medium of claim 7 wherein in said control method:

said detected events include at least one of a change in hardware resources of a robot controlled by said controller, a change in output data which enables a program for controlling manipulator actions, and a change in output data which enables peripheral devices to perform synchronization and communication.

9. The medium of claim 8 wherein said control method further comprises:

storing in a shared memory area that can be referenced and updated by multiple tasks, event resource states in order to keep track of said detected events;

updating said event resource states stored in said shared memory based upon changes in said detected events; and updating a hardware resource based upon event resource states that have been updated in said event resource state update step.

10. The medium of claim 7 wherein said control method of claim 9 further comprises:

preventing swapping out of a program by directing said generic operating system to start a program, on a regular basis at specified time intervals, said program having registered the fact that it is waiting for occurrence of an event.

* * * * *